United States Patent Office 3,292,294
Patented Dec. 20, 1966

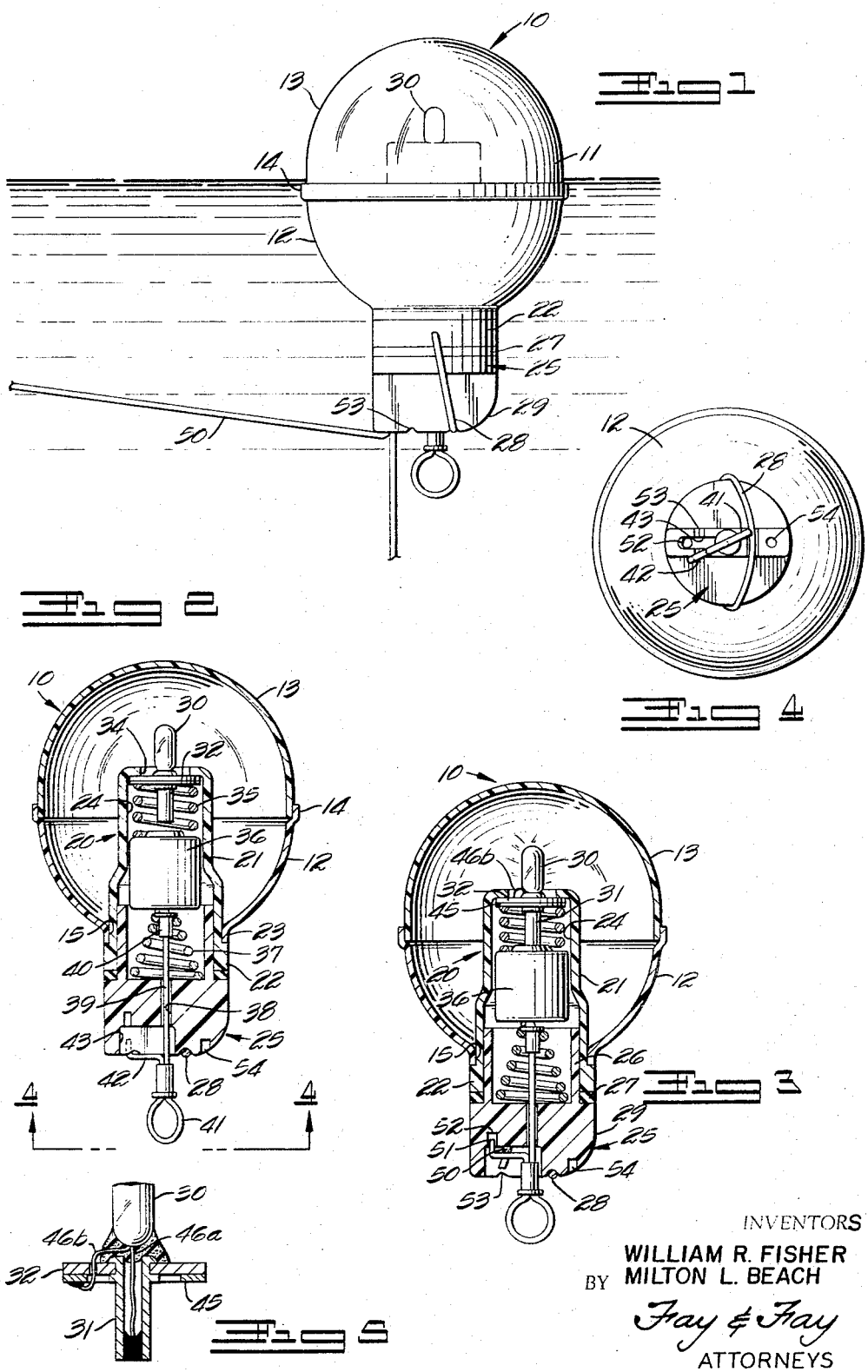

3,292,294
ILLUMINABLE FISHING DEVICE
Milton L. Beach, 722 Maple Heights Drive, and William R. Fisher, Township Road 92, both of Galion, Ohio 44833
Filed Sept. 23, 1964, Ser. No. 398,682
2 Claims. (Cl. 43—17.5)

This invention relates to a fishing float and more particularly to an illuminated fishing float.

Illuminated fishing floats of various designs have been known heretofore. However, these prior art devices have experienced certain difficulties which have prevented such devices from becoming of significant commercial value. One major drawback has been the general lack of adaptability of these devices to both daytime and nighttime fishing. Thus, the illuminated devices devised heretofore have generally incorporated a mechanism which, once actuated, provides a constant light which is obviously unnecessary during the daytime and which quickly depletes the battery or other source of energy.

Another type of illuminated fishing bobber is the type which employs a mechanism to utilize the bite of a fish as a means for actuating the light. Such devices have required an expensive, intricate mechanism and ordinarily there is no provision for discontinuing the actuation of the light during the daytime hours.

Another problem generally experienced by the prior art has been the susceptibility to damage due to the constant vibrations and impacts imposed on the structure. Such abuse has had a particularly adverse effect on the electrical apparatus which is incorporated in the fishing float.

It is an object of this invention to provide an illuminated fishing device.

It is another object of this invention to provide an illuminated fishing device which includes a switch operable to discontinue the actuation of the light.

Another object of the invention is to provide a fishing float including illuminating means and which includes shock absorbing means for the illuminating mechanism.

Still another object of this invention is to provide an illuminated fishing float wherein the switch for actuation of the illuminating means is also used to connect the float to a fishing line.

A more specific object of the invention is the provision of a fishing float having illuminating means in the interior thereof with a switch-operated battery adapted to actuate the illuminating means and resilient means floatingly mounting said battery in the interior of said float.

To the accomplishment of the foregoing and related ends, the following description sets forth in detail one approved means of carrying out the invention. Such disclosed means are not meant to be limiting inasmuch as it constitutes but one of the various ways in which the principles of the invention may be applied.

In the drawings wherein like reference numerals indicate like parts in the various views:

FIG. 1 is an illustration of the float comprising the instant invention in a supporting fluid;

FIG. 2 is a sectional view of the float of FIG. 1 with the illuminating means in an inactive condition.

FIG. 3 is a view similar to FIG. 2 showing the illuminating means actuated;

FIG. 4 is a view taken along line 4—4 of FIG. 2;

FIG. 5 is a section view of the illuminating means illustrating its mounting and electrical connections.

Turning to FIG. 1, there is illustrated a buoyant fishing float indicated generally by the reference numeral 10. The float is comprised of a body 11 which is formed of two hemispherical portions. The lower hemispherical portion 12 is composed of a substantially opaque plastic material. The upper hemispherical portion 13 is comprised of a substantially translucent or transparent plastic material through which light may readily pass. The upper portion 13 is frictionally retained in a circumferential lip 14 formed on the rim of the lower portion 12. Additional securing means such as cement or glue may be employed.

An opening 15 is formed in the lowermost point of the hemispherical portion 12. Received through the opening 15 is an illuminating assembly indicated generally by the reference numeral 20.

Assembly 20 comprises a tubular member 21 which is of a dimension adapted to pass through the opening 15 with a close frictional fit. An annular boss 22 is formed on the lower end of the member 21 and is adapted to engage a shoulder 23 formed on the body member 12 adjacent to the opening 15 thereby to limit the extent to which the tubular member 21 may be inserted into the body 11. Additional means such as cement or glue may be used to maintain the tubular member 21 in the position shown in FIG. 2. It is believed apparent that the presence of the tubular member 21 in the opaque portion of the body 11 places the center of gravity of the device in the lower portion.

The cavity 24 formed by the tubular member 21 is adapted to be closed by a cap 25. The cap includes a tubular portion 26 which is telescopically received internally of the tubular member 21. The cap is of a generally circular construction with a diameter substantially equal to the diameter of the boss 22. A sealing ring 27 is carried by the cap and provides a sealing juncture between the boss 22 and the body of the cap 25.

A bail 28 pivotally carried by the boss 22 is adapted to be received over a curved surface 29 formed on a raised portion of the cap and received in a groove thereby to secure the cap in position closing the tubular member 21.

Adapted to be received in the tubular member is a source of illumination which as illustrated herein comprises a bulb 30. The bulb 30 is supported on shock absorbing rubber adhesive which, in turn, is supported on a socket 31 and a composition board 32. The board 32 is adapted to abut against the inner end of the tubular assembly 21 with the bulb 30 projecting through an aperture 34. As may be seen in FIG. 2 and FIG. 3, the bulb projects through the aperture into the generally transparent area of the body 11 thus permitting the light to be visible when the bulb is actuated.

A spring 35 abuts the board 32 thereby maintaining the bulb in its position projecting through the aperture 34. The opposite end of the spring 35 abuts a battery 36 which is received in the cavity 24 of the tubular assembly. Another spring 37 abuts the opposite end of the battery and thus provides a means whereby the battery is suspended between two resilient supports to provide a shock absorbing support for the battery. The opposite end of the spring 37 engages the cap 25.

Projecting through an aperture 38 in the cap 25 is a wire actuating means 39. This wire actuating means includes an end 40 which is secured to the end of the spring 37 adjacent to the battery 36. The opposite end of the wire 39 includes a loop 41 and a transversely extending leg 42. It may be seen that by pulling on the loop 41, the wire 39 acts through the end 40 to compress the springs 37 against its natural resiliency. Appropriate sealing means are used to seal the aperture 38.

In the normal situation, the spring 37 is stronger than the spring 35 so that, absent a pull on the loop 41, the spring 37 will tend to displace the battery 36 against the bias of the spring 35. This is illustrated in FIG. 3 wherein the battery 36 engages the end of the socket 31. In FIG. 2, it is shown that the wire 39 has been displaced to a position wherein the spring 37 is compressed thus permitting the spring 35 to bias the battery 36 away from the socket 31.

To control the action of the wire 39, the transverse leg 42 is designed to be received in a narrow slot 43 which is formed in the raised portion projecting from the base of the cap 25. The wire 39 is rotatably received in the aperture 38 in the base 25 so that rotation of the wire may selectively place the transverse leg 42 in the slot 43 or in a position wherein the leg 42 is transverse to the slot thus serving as a means limiting the inward movement of the wire 39 under the bias of the spring 37. It is believed apparent that with the leg 42 oriented in a position to be received in the slot 43, the springs 37 will, in the absence of an opposite force acting on the loop 41, cause the wire 39 to be displaced inwardly until the transverse leg 42 abuts the bottom of the slot 43 as shown in FIG. 3. FIG. 2 is an illustration of the device wherein the leg 42 overlies the slot in a substantially transverse manner thus preventing inward movement of the wire 39 under the bias of the spring 37.

To provide a complete circuit for the bulb 30, the board 32 includes an annular metallic disk 45 which is secured to the bottom thereof. The socket 31, which is also of a metallic character, passes through the center of the disk and the composition material forming the board 32 serves as an insulator between the disk and the socket. A bulb lead 46a is attached to the socket 31 and a second bulb lead 46b passes through the composition board and is in contact with the metallic disk 45 thereby providing a circuit between the disk and the socket. Solder or other appropriate means may be used to secure the ends of leads 46a and 46b to their respective metallic members. The metallic spring 35 abuts the disk 45 and the battery 36 thereby completing the circuit when the battery abuts the socket 31.

It may be seen that the wire 39 and its selective positions comprises a switch whereby the actuation of the bulb 30 may be selectively controlled depending upon the orientation of the transverse leg 42 relative to the slot 43. By this means, the life of the battery 36 may be conserved and thereby obviate the necessity for frequent replacement. In addition, the structure above described provides a means whereby the battery and the bulb may be replaced with a minimum of effort.

An additional feature is the provision for securing the float to a fishing line such as that indicated at 50. Thus, the transverse leg 42 includes a tang 51 which is receivable in a bore 52 formed in the bottom of the slot 43. To attach the float to a fishing line 50, it is only necessary to pull on the loop 41, place the line under the transverse leg 42, orient the leg 42 with the slot 43 and release the loop 41. The spring 37 will displace the wire 39 inwardly and cause the transverse leg 42 to abut the bottom of the slot 43. In this position, the tang 51 will be received in the depression or bore 52 and the line 50 will be secured in position as shown in FIG. 3. Appropriate notches 53 may be provided in the cap to receive the fish line. In the event it is desired to use the float without actuation of the bulb 30, the leg 42 may be rotated so that the tang 51 is received in notch 54 thus securing the fish line to the float.

It is believed that each of the objects above set forth have been fully accomplished by the structure described herein. Additional modifications and changes will suggest themselves to those having ordinary skill in the art. Changes such as these are contemplated by the principles of this invention so that although for ease of description, the principles of the invention have been set forth in connection with but a single illustrated embodiment, it is not intended that these illustrated embodiments or the terminology employed in describing them is to be limiting; but rather, it is our desire to be restricted only by the scope of the appended claims.

We claim:
1. An illuminable buoyant fishing device comprising:
   a hollow buoyant body having a portion thereof adapted to permit the passage of light therethrough;
   an opening formed in said body;
   a tubular member extending into the hollow interior of said body through said opening;
   illuminating means carried by the interior end of said tubular member;
   cap means closing the other end of said tubular member;
   means securing said tubular member in said opening;
   a battery disposed in said tubular member;
   first spring means in said tubular member biasing said battery away from engagement with said illuminating means;
   second spring means in said tubular member biasing said battery toward engagement with said illuminating means; and
   switch means extending through said cap member into the interior of said tubular member;
   said switch means including a first leg member extending into said tubular member and being operable to overcome the bias of said second spring means whereby said battery may be displaced away from engagement with said illuminating means;
   said switch means further including a second leg extending transverse to said first leg;
   a slot formed in said cap and being adapted to receive said second leg in one position of said switch;
   said switch being rotatable between said one position and a second position wherein said leg extends across said slot.

2. The device of claim 1 wherein said illuminating means comprises a socket member supported by said tubular member;
   an annular disk carried by said tubular member;
   a bulb supported on said socket member;
   said bulb being electrically connected with said disk and said socket member;
   said first spring means being engaged with said disk; and
   said second spring means biasing said battery toward engagement with said socket means.

References Cited by the Examiner

UNITED STATES PATENTS

| 2,088,201 | 7/1937 | Goertzen | 43—17 |
| 2,476,633 | 7/1949 | Sohr | 43—17 |
| 2,490,669 | 12/1949 | Burke | 43—17.5 XR |
| 2,722,763 | 11/1955 | Miner et al. | 43—17 |

FOREIGN PATENTS 446,600    5/1936    Great Britain.

ABRAHAM G. STONE, *Primary Examiner.*
R. L. HOLLISTER, *Assistant Examiner.*